United States Patent
Fenayon et al.

(10) Patent No.: US 8,833,121 B2
(45) Date of Patent: Sep. 16, 2014

(54) ANTITHEFT DEVICE FOR A STEERING COLUMN, AND RELATED METHODS FOR MOUNTING A SUPPORT CLAMP

(75) Inventors: Ludovic Fenayon, Cretell Cedex (FR); Christophe Perrin, Cretell Cedex (FR)

(73) Assignee: Valeo Securite Habitacle, Créteil (FR)

( * ) Notice: Subject to any disclaimer, the term of this patent is extended or adjusted under 35 U.S.C. 154(b) by 225 days.

(21) Appl. No.: 13/258,931

(22) PCT Filed: Mar. 15, 2010

(86) PCT No.: PCT/EP2010/053283
§ 371 (c)(1),
(2), (4) Date: Dec. 5, 2011

(87) PCT Pub. No.: WO2010/108808
PCT Pub. Date: Sep. 30, 2010

(65) Prior Publication Data
US 2012/0096907 A1    Apr. 26, 2012

(30) Foreign Application Priority Data
Mar. 25, 2009 (FR) ...................................... 09 01407

(51) Int. Cl.
*B60R 25/02* (2013.01)
*B60R 25/021* (2013.01)

(52) U.S. Cl.
CPC ....... *B60R 25/02105* (2013.01); *B60R 25/0211* (2013.01)
USPC ............................................. 70/252; 70/185

(58) Field of Classification Search
CPC ................ B60R 25/02; B60R 25/0211; B60R 25/02113; B60R 25/02126; B60R 25/02142; B60R 25/02153
USPC ........................................... 70/182–186, 252
See application file for complete search history.

(56) References Cited

U.S. PATENT DOCUMENTS 1,436,585 A * 11/1922 Gaynor ........................... 70/183
4,627,514 A * 12/1986 Brown ............................ 70/252

(Continued)

FOREIGN PATENT DOCUMENTS

DE    17 55 666 A1    10/1971
DE    20 35 507 A1    1/1972

OTHER PUBLICATIONS

International Search Report w/translation from PCT/EP2010/053283 dated Jun. 1, 2010 (4 pages).

*Primary Examiner* — Christopher Boswell
(74) *Attorney, Agent, or Firm* — Osha Liang LLP

(57) ABSTRACT

The invention relates to an antitheft device for a motor vehicle steering column, comprising: a housing (3) in which a movable bolt (5), configured so as to prevent the steering column from rotating, and a lock (7) for controlling the movement of said bolt (5), are arranged; a clamping collar (9) configured so as to be mounted on the steering column (2) and having a first half-collar (9a) rigidly connected to the housing (3), and a second half-collar (9b): a first end (11) of which is pivotably mounted relative to the first half-collar (9a) along a pivotal movement axis (A1) that is substantially parallel to the steering column; and a second end (13) of which is configured so as to be attached to the first half-collar (9a) when mounted on the steering column via a clamping means (37). According to the invention, the second half-collar (9b) has, on the first end (11) thereof, a pivotal movement holding shaft (15), the first half-collar (9a) comprising a bearing (17) associated with said holding shaft (15), and an opening (19a) for accessing said bearing (17), and also has a means for supporting said holding shaft (15) in said first half-collar (9c) opposite said bearing (17) so as to avoid an untimely disconnection of said half-collars (9a), (9b) before being mounted on the steering column (2). Said support means is configured so as to at least partially close the opening (19a) for accessing said bearing (17) and to hold said shaft (15) in said first half-collar (9a) opposite said bearing (17).

14 Claims, 3 Drawing Sheets

(56) References Cited

U.S. PATENT DOCUMENTS

Figure 1:
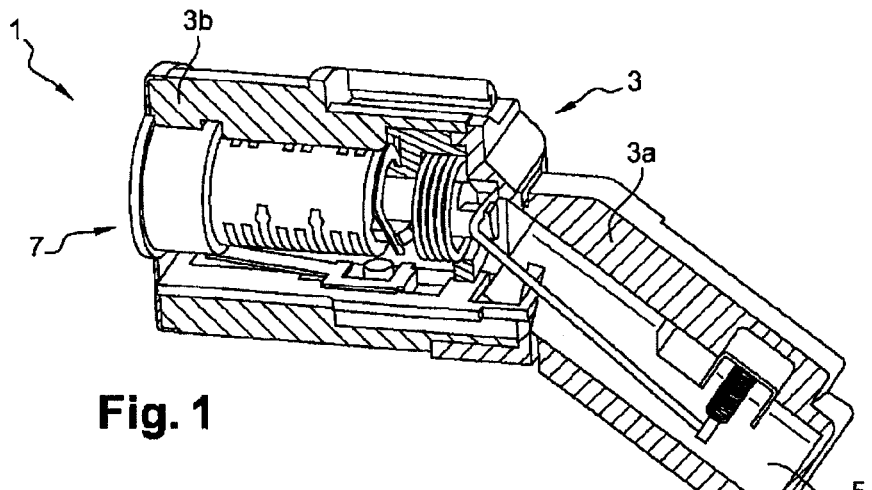

| | | | |
|---|---|---|---|
| 4,892,276 A * | 1/1990 | Alessio | 248/74.1 |
| D349,034 S * | 7/1994 | Webster | D8/333 |
| 5,363,677 A * | 11/1994 | Cox | 70/237 |
| 6,393,880 B1 * | 5/2002 | Vance, Sr. | 70/174 |
| 7,316,138 B2 * | 1/2008 | Goshima et al. | 70/186 |
| 7,716,959 B2 * | 5/2010 | Okada | 70/186 |
| 8,234,895 B2 * | 8/2012 | Nakamoto et al. | 70/252 |
| 2002/0038495 A1 * | 4/2002 | Anthes et al. | 24/279 |
| 2007/0068207 A1 | 3/2007 | Goshima et al. | |

* cited by examiner

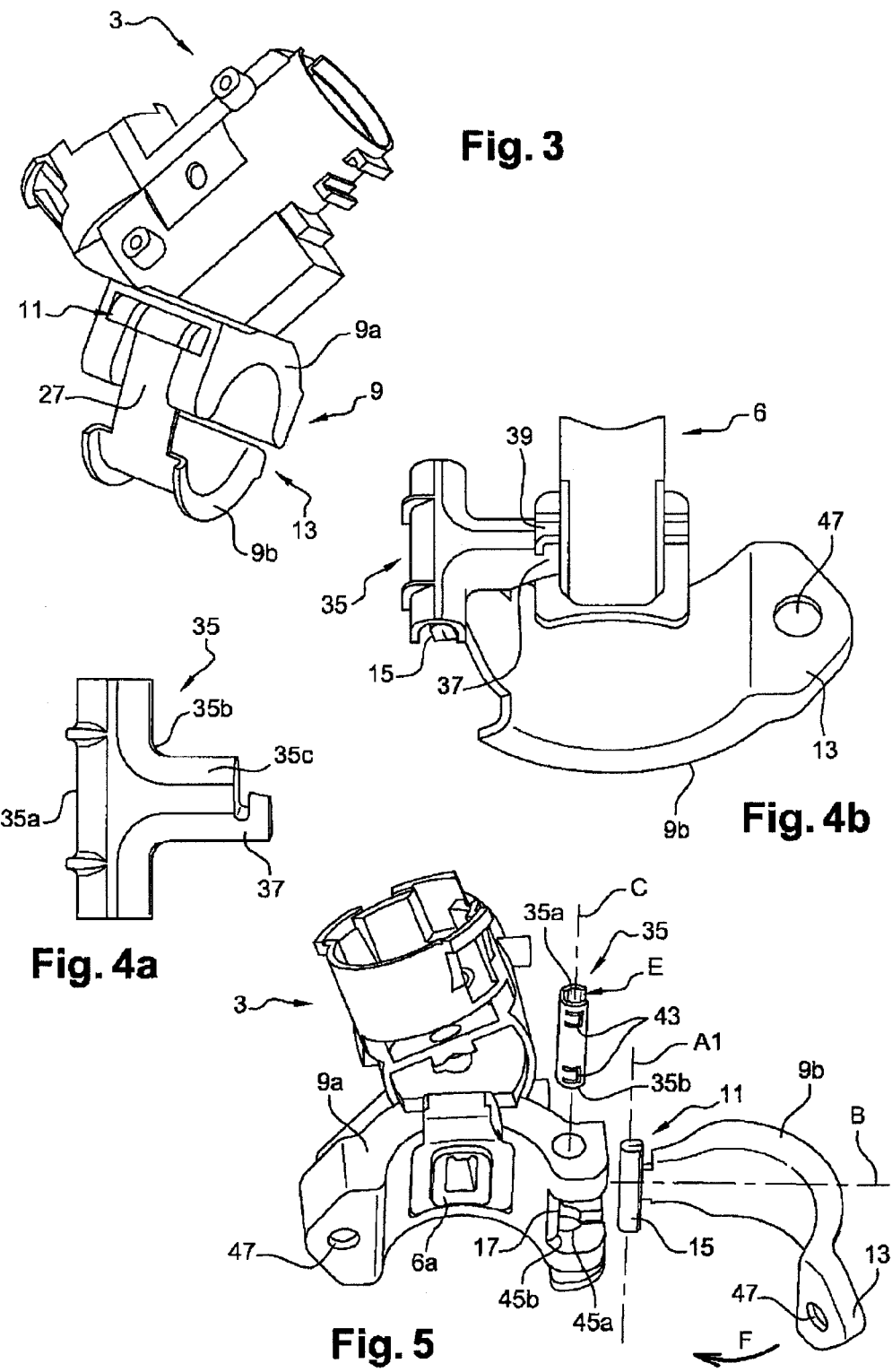

ANTITHEFT DEVICE FOR A STEERING COLUMN, AND RELATED METHODS FOR MOUNTING A SUPPORT CLAMP

The invention relates to an antitheft device for a steering column of a motor vehicle.

The invention relates more particularly to an antitheft device, of the type comprising a housing in which an antitheft mechanism is arranged in order to immobilize the steering column. The immobilization is usually carried out with the aid of a movable bolt which is controlled in movement by means of a rotary lock between a rest position, in which the steering column is released, and an active position in which the steering column is prevented from rotating.

To do this, such a housing is mounted around the steering column. Some of the antitheft devices known in the prior art provide, for the installation of the housing on the steering column, a clamping collar attached to the housing and installed around the steering column. The known structure of the clamping collar comprises two half-collars joined on the one hand with the aid of a transverse pin and on the other hand by means of a screw for installation by clamping the antitheft device onto the steering column.

However, this clamping installation requires a sturdy connection between the two half-collars which, in the current situation, requires considerable and costly installation means. Specifically, the installation of the pin requires the use of a mechanical squeezing device to achieve this connection and demands the application of considerable forces. Moreover, the difficulty in installation causes considerable rejects.

Moreover, an antitheft device proposing accessibility for installation and consequently for removal can allow a possible thief to work directly on the antitheft mechanism in order to unlock the antitheft device and thus take possession of the vehicle, which greatly limits the anti-break-in role of the antitheft device.

The object of the present invention is therefore to alleviate these drawbacks of the prior art by proposing an improved antitheft device for a steering column allowing a manual installation of the antitheft device onto the steering column which installation is simple and not very costly while preventing the two clamping half-collars from being separated before installation on the steering column.

Accordingly, the subject of the invention is an antitheft device for a steering column of a motor vehicle, comprising:
  a housing in which a movable bolt is arranged that is configured to prevent the steering column from rotating and a lock for controlling the movement of said bolt, and
  a clamping collar configured to be mounted on the steering column and having a first half-collar secured to the housing, and a second half-collar of which:
    a first end is mounted articulated relative to the first half-collar along an axis substantially parallel to the axis of the steering column, and of which
    a second end is configured to be attached to the first half-collar upon installation on the steering column, by means of a clamping means,
  the second half-collar (9b) supporting at its first end (11) a pivoting support shaft (15),
  the first half-collar (9a) comprising a bearing (17) associated with said support shaft (15) and an opening (19a) for access to said bearing (17),
  a means for retaining said support shaft (15) in said first half-collar (9c) facing said bearing (17) so as to prevent an inadvertent separation of said half-collars (9a), (9b) before installation on the steering column (2), characterized in that said retention means is configured so as to at least partially close off the opening (19a) for access to said bearing (17) and keep said shaft (15) in said first half-collar (9a) facing said bearing (17).

With this configuration, the cumbersome means of installation for the connection between the two half-collars is dispensed with since a simple, low-cost manual insertion of the support shaft into the bearing is sufficient and provides a sturdy connection.

Moreover, the two half-collars are provisionally secured before being tightly installed around the steering column.

The antitheft device may also comprise one or more of the following features taken separately or in combination:
  the retention means is made in the form of a substantially U-shaped retention yoke for receiving said support shaft,
  the first half-collar comprises an insertion guide for inserting said support shaft into said bearing,
  the retention means is mounted so as to be able to move in translation in said bearing in order to reach said retention position,
  the retention means is mounted so as to be able to rotate in said bearing in order to reach said retention position,
  the retention means is made of plastic or metal,
  the retention yoke has a lateral branch of said yoke which at least partially closes off the opening for access to said bearing,
  said device also comprises a means for immobilizing the retention means in the retention position,
  the retention means is held in the retention position by a forced installation of said retention means onto said bearing,
  the housing comprises an immobilization means configured to rest against the retention means,
  the retention yoke has a substantially hook-shaped portion configured to interact with a counter-hook provided on a bolt guide securely mounted to the housing,
  the retention yoke has, on its outer wall, at least one clipping tongue for interacting with at least one complementary clipping notch provided in said first half-collar,
  the retention yoke is mounted so as to slide in said bearing in order to reach said retention position.

The invention also relates to a method for installing a retention yoke in such an antitheft device, characterized in that it comprises the following steps:
  said support shaft is installed in the retention yoke,
  the assembly formed by the retention yoke and said support shaft is installed in said bearing, said yoke being placed in said first half-collar.

The invention also relates to a method for installing a retention yoke in such an antitheft device, characterized in that it comprises the following steps:
  the retention yoke is installed in said first half-collar along a first insertion axis that is substantially parallel to said pivoting axis, in an open position in which the internal space of said yoke delimited by the two lateral branches opens onto an opening of said first half-collar so that the openings of said first half-collar and of said yoke coincide,
  said support shaft is installed in said yoke along a second insertion axis that is substantially perpendicular to the first insertion axis, and
  the assembly formed by said yoke and said support shaft is rotated on said pivoting axis until a lateral branch of said yoke at least partially closes the opening of said first half-collar.

Figure 2A:
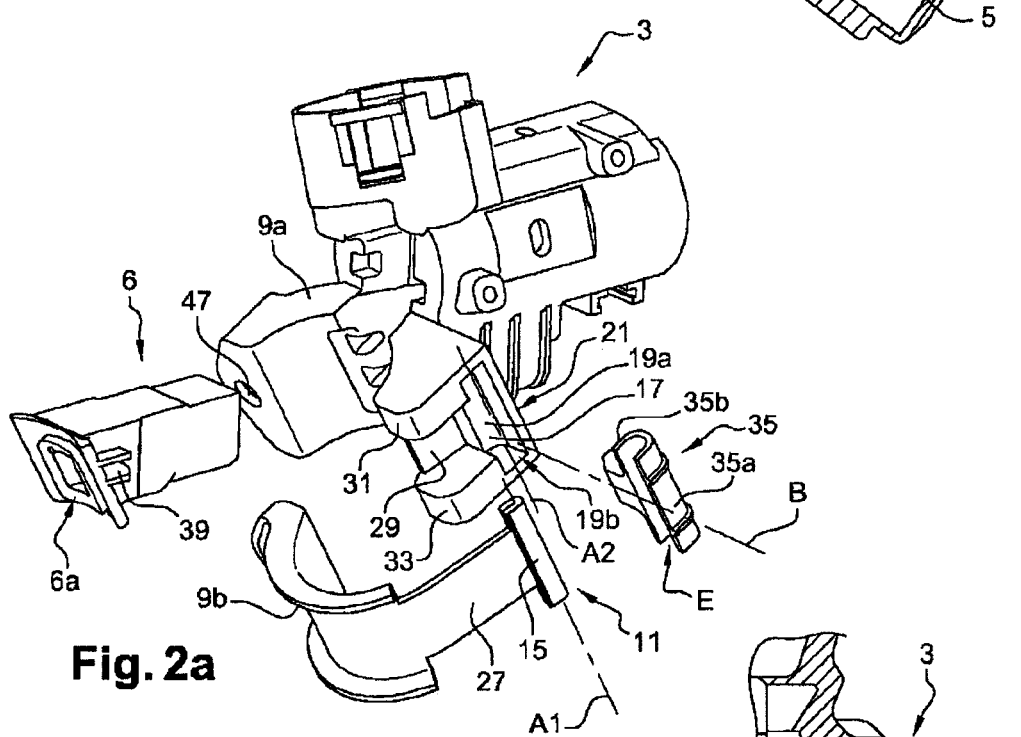
Figure 2B:
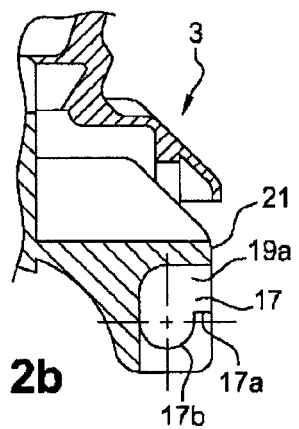
Figure 6A:
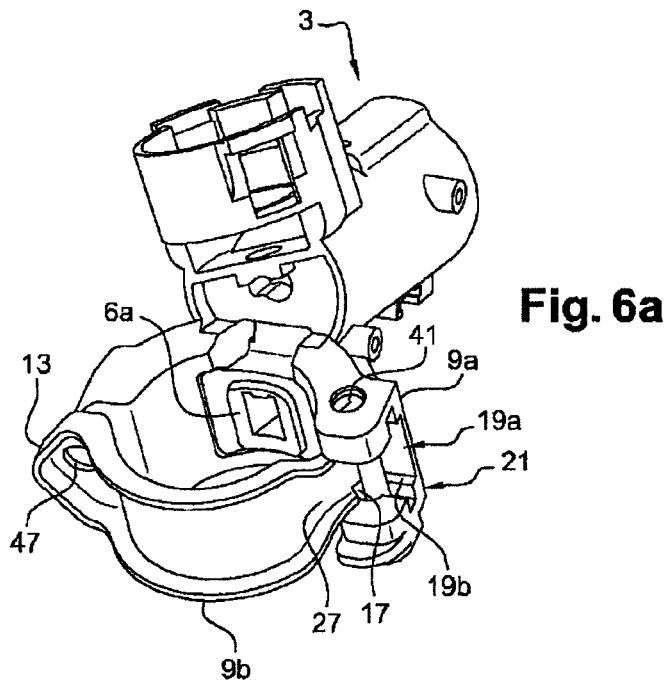
Figure 6B:
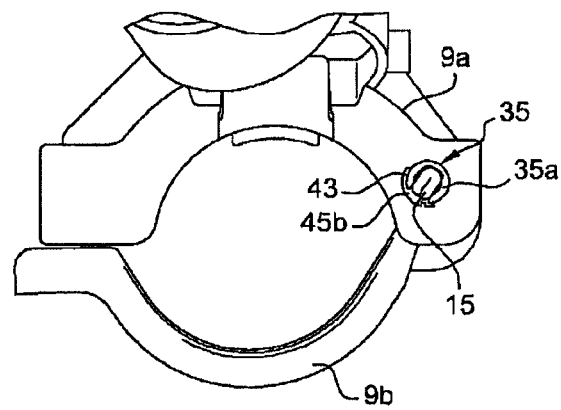
Figure 7:
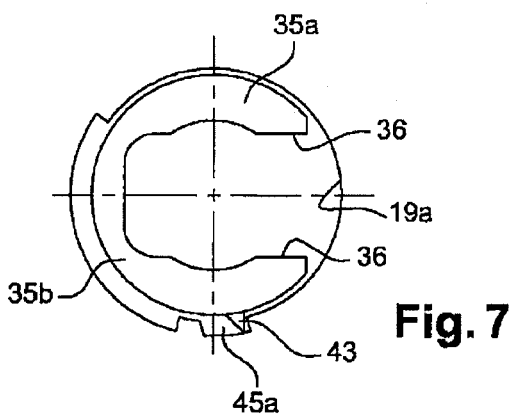

Other features and advantages of the invention will emerge from the following description, given as an example and having no limiting character, with respect to the appended drawings in which:

FIG. 1 represents an antitheft device designed to be installed on a steering column by means of a clamping collar, FIG. 2a illustrates a first embodiment of an antitheft device of which the two half-collars are disassembled, FIG. 2b is a partial view in section of the first half-collar, FIG. 3 is an assembled view of the device of FIG. 2a, FIG. 4a represents in greater detail a retention yoke of the device of FIG. 2a, FIG. 4b represents the yoke of FIG. 4a interacting with a bolt guide of the device of FIG. 2a, FIG. 5 illustrates a second embodiment of an antitheft device of which the two half-collars are disassembled, FIG. 6a is an assembled view of the device of FIG. 5, FIG. 6b is a view from the top of FIG. 6a in a retention position, FIG. 7 is a view from above of a retention yoke of the device of FIG. 5.

In these figures and in the rest of the description, identical or similar elements are indicated by the same references.

The invention relates to an antitheft device designed to be installed on a steering column (not shown) of a motor vehicle in order to make the use of the steering column secure.

FIG. 1 represents one embodiment for an antitheft device 1. This antitheft device 1 comprises:
- a housing 3 of an antitheft body having a first portion 3a and a second portion 3b,
- a bolt 5 mounted so as to move in the first portion 3a,
- a lock 7 mounted so as to rotate in the second portion 3b in order to control the movement of the bolt 5.

The bolt 5 is mounted so as to move between an unlocked position in which it is designed to be placed at a distance from the steering column (not shown), and a locked position in which it is designed to prevent the steering column from rotating.

Accordingly, the bolt 5 is mounted so as to slide in the first portion 3a of the housing 3, via a bolt guide 6 (see FIG. 2a). Thus, in the unlocked position, the bolt 5 is in the rearward retraction position, that is to say completely withdrawn inside the bolt guide 6. Conversely, in the locked position, the bolt 5 protrudes at the end 6a of the bolt guide 6 so as to be able to interact conventionally by fitting into the steering column.

As illustrated in FIGS. 2, 3 and 5 to 6b, a clamping collar 9 is provided attached to the housing 3 and designed to be mounted around the steering column by clamping in order to install the housing 3 on the steering column. Naturally, the clamping collar 9 may form an integral part of the housing 3.

This clamping collar 9, for example made of bent metal sheet, has an internal diameter that is slightly greater than the external diameter of the steering column shaft so as to be able to be placed around the latter.

Moreover, the clamping collar 9 has a first half-collar 9a and a second half-collar 9b.

The first half-collar 9a can be attached to the housing 3 or form an integral part of this housing 3, more precisely to the first portion 3a of the housing 3 incorporating the bolt 5 and the bolt guide 6, and the second half-collar 9b is connected to the first half-collar 9a. For this, the two half-collars 9a and 9b have matching shapes.

The second half-collar 9b comprises a first end 11 and a second end 13 connected respectively to the first half-collar 9a.

The first end 11 is installed articulated relative to the first half-collar 9a along a pivoting axis A1 that is substantially parallel to the axis of the steering column.

For a sturdy articulated connection between the first half-collar 9a and the second half-collar 9b, the first end 11 of the second half-collar 9b supports a pivoting support shaft 15.

For this purpose, the first end 11 of the second half-collar 9b can form a housing to accommodate the support shaft 15, for example made in the form of a pin.

According to a variant embodiment, the support shaft 15 is formed in a single piece with the second half-collar 9b, for example by an operation to roll the first end 11 of the second half-collar 9b.

According to another variant illustrated in FIGS. 2 and 5, the second half-collar 9b formed in a single piece with the support shaft 15 can be generally T-shaped, the ends of the T serving as a shaft.

This support shaft 15 interacts with a bearing 17 associated with the first half-collar 9a. The bearing 17 is arranged in a lateral face 21 of the first half-collar 9a placed opposite the first end 11 of the second half-collar 9b.

Also, in this lateral face 21 of the first half-collar 9a, an opening 19a is provided facing the first end 11 of the second half-collar 9b so that the shaft 15 can be inserted into said bearing 17 provided in the first half-collar 9a. The opening 19a therefore leads to the open end of said half-collar 9a.

This opening 19a forms an obligatory passageway for said support shaft 15 in the bearing 17. In other words, the opening 19a constitutes the access to said bearing to the inside or to the outside of said first half-collar 9a.

Provision can be made for the first half-collar 9a to comprise an insertion guide 19b for the support shaft 15. More precisely, said insertion guide 19b is arranged in said opening 19a.

The insertion guide 19b is, in the example illustrated, an insertion slot arranged in the lateral face 21 and extending along an axis A2 that is substantially parallel to the support shaft 15 in order to make it possible to insert the support shaft 15 into the first half-collar 9a.

Moreover, the support shaft 15 is inserted into the bearing 17 via the opening 19a along an insertion axis B substantially perpendicular to the pivoting axis A1.

According to a first embodiment, the first half-collar 9a forms an insertion housing for the support shaft 15 which has a generally parallelepipedal shape and can be accessed via the opening 19a of said first half-collar, the bearing 17 having a flat bottom.

According to a second possible embodiment and as illustrated in FIG. 2b, the bearing 17 may also include at least one recess 17b, at the bottom of the bearing corresponding to the end of travel for fitting the support shaft 15 onto said bearing 17 of the first half-collar 9a.

This recess 17b constitutes the final location of said support shaft 15 once inserted into the half-collar 9a and secures the positioning of the support shaft 15 at the bottom of the bearing 17 when the second half-collar 9b is tightened with the first half-collar 9a.

The recess 17b therefore extends a rectilinear surface 17a of the bearing 17, which rectilinear surface 17a is traveled along by the support shaft 15 when it is inserted. Because this recess 17b extends the rectilinear surface 17a of the bearing 17 substantially in a direction transverse to this rectilinear surface, the bearing 17 is generally L-shaped when it is observed laterally from inside the bearing 17.

This "L" shape therefore allows a movement of the support shaft 15 in two directions that are substantially perpendicular to one another.

The recess 17b that is part of the bearing 17 is made on an axis that is substantially perpendicular to the axis of the opening 19a and has a shape that is for example semicylindrical, closed at one end by the rectilinear portion 17a of said bearing 17.

Moreover, in order to make it easier to insert the support shaft 15 into the bearing 17 of the first half-collar 9a:
- the second half-collar 9b may have a lateral portion 27 of lesser width than the rest of the second half-collar 9b, and
- the first half-collar 9a may have a recess 29 of corresponding width, arranged on its lateral face 21 so as to form two protrusions 31, 33 on either side of the recess 29.

Moreover, the device 1 comprises a means for retaining the support shaft 15 in said first half-collar 9c facing said bearing 17 so as to prevent an inadvertent separation of the half-collars 9a, 9b before installation on the steering column. Accordingly, the retention means is removable and can be removed for the installation of the collar 9 around the steering column.

This retention means also acts as a cover for the opening 19a of said bearing.

The retention means is configured so as to at least partially close off the opening 19a of the bearing 17. Thus, this retention means keeps the support shaft 15 in said bearing and prevents any removal of the support shaft 15 through the opening 19a of said bearing 17.

In other words, said retention means is arranged in the bearing 17 so that it makes it possible to keep the support shaft 15 in said bearing 17 but without preventing all movements. Thus, the support shaft 15 can be movable only in rotation in said bearing 17 while not being able to be extracted because of the at least partial closing of said opening 19a by said retention means.

The retention means is for example a retention yoke 35 having a substantially "U" overall shape with a first lateral branch 35a and a second lateral branch 35b.

The retention yoke 35 may straddle the support shaft 15, its arms 35a and 35b then being situated on either side of the support shaft 15.

One of the branches 35b is situated inside the first half-collar 9a relative to the support shaft 15, the other branch 35a is situated outside the half-collar relative to the support shaft 15.

It is this branch 35a that closes the opening 19a and thus prevents said support shaft 15 from inadvertently coming out of the first half-collar 9a.

According to another embodiment, the retention means has a portion at least partially closing the opening 19a, but without having a portion extending on the inside of the support shaft 15.

Thus, the retention means has, according to this other alternative, the shape of an "L" of which one branch at least partially closes the opening 19a and of which the other branch covers the support shaft 15 between its outside and its inside relative to the first half-collar 9a.

An embodiment in which the retention means has a portion placed at least partially closing the opening 19a is also provided. It can therefore consist of a retention part anchored on an edge of the opening 19a.

The internal space E delimited by these two lateral branches 35a, 35b forms a housing for receiving the support shaft 15.

This yoke 35 is placed in the bearing 17 in a retention position in which the first lateral branch 35a closes the insertion opening 19a. Specifically, in this case, the support shaft 15 can no longer be removed from the bearing 17 via the opening 19a.

The yoke 35 can reach this retention position by translation or, as an alternative, by rotation in the bearing 17.

According to a first embodiment illustrated in FIGS. 2 and 3, the yoke 35 can be mounted in the bearing 17 along the insertion axis B for inserting the support shaft 15 into the bearing 17.

According to one embodiment alternative, it is possible to provide for first inserting the yoke 35 into the bearing 17 then inserting the support shaft 15 into the yoke before placing the yoke 35 in the retention position, for example by rotation of the second half-collar 9b.

In the example illustrated, provision is made to first insert the support shaft 15 into the yoke 35, then to insert the assembly formed by the yoke 35 and by the support shaft 15 into the bearing 17 via the insertion slot 19b.

When this assembly is thus installed, the opening 19a of the insertion slot 19b is closed by the lateral branch 35a and the support shaft 15 is immobilized in the bearing 17.

The yoke 35 can be forced into the bearing 17 in order to ensure that the yoke 35 is immobilized in the retention position and prevent any inadvertent removal of the yoke 35 and consequently of the support shaft 15. In this case, the yoke 35 sustains a stress that fixes it securely in the bearing 17.

For additional security, it is possible to provide an additional means for immobilizing the yoke 35.

For example, the bolt guide 6 can immobilize the yoke 35 by pressure when it is installed on the housing 3 in order to keep the yoke 35 in the bearing in the retention position. The bolt guide 6 then forms an immobilization means for the yoke 35.

Naturally, it is possible to make another portion or component of the housing 3 able to form such a means for immobilizing the yoke 35.

Accordingly, the yoke 35 comprises a third branch 35c, that is more visible in FIGS. 4a and 4b, extending perpendicularly to the pivoting axis A1, from the second lateral branch 35b to the bolt guide 6.

It is possible to provide a further means for coupling the yoke 35 to the housing 3 or to any other component of the housing 3, such as for example the bolt guide 6.

Accordingly, the third branch 35c has a substantially hook-shaped end portion 37 for interacting with a counter-hook 39 provided in this example on the bolt guide 6.

Thus, once the yoke 35 is placed in the retention position in the bearing 17, the hook 37 and the counter-hook 39 immobilize the yoke 35 which cannot then be removed without an intentional action by an operator, for example before installing the collar 9 around the steering column.

As an alternative, it is possible to immobilize the yoke 35 in the retention position by clipping.

According to a second embodiment illustrated in FIGS. 5 to 7, the yoke 35 can be installed in the bearing 17 along the axis C substantially perpendicular to the insertion axis B of the support shaft 15 in the bearing 17 and substantially parallel to the pivoting axis A1.

Accordingly, an insertion hole 41 is provided for the yoke 35 on the top of the lateral face 21 of the first half-collar 9a at the bearing 17. This insertion hole 41 has a circular shape corresponding to the shape of the yoke 35.

In this case, the yoke 35 and the support shaft 15 are installed separately in the bearing 17.

Alternatively, this insertion hole 41 is coaxial with the recess or final location of the support shaft 15 in said bearing 17.

More precisely, the yoke 35 is inserted into the bearing 17 in an open position, so that the internal space E of the yoke 35 leads to the opening 19a of said bearing therefore making it possible to subsequently install the support shaft 15 in the yoke 35.

In this open position, the opening of the yoke 35 and the opening 19a of the bearing 17 coincide so that no lateral branch 35a, 35b of the yoke 35 obstructs the opening 19a.

Then, by carrying out a rotation of the assembly formed by the yoke 35 and the support shaft 15 along the pivoting axis A1 in the direction of the arrow F (FIG. 5), the yoke 35 is brought to the retention position so that a lateral branch 35a obstructs the opening 19a of said bearing 17 (FIGS. 6a and 6b).

As is more visible in FIG. 7, the yoke 35 has an internal shape that complements the external shape of the support shaft 15 such that, when the second half-collar 9b pivots, the support shaft 15 presses on the lateral edges 36 of the yoke 35 in order to rotate it to the retention position.

It is also possible to provide that the yoke has less material in the middle of the lateral branches 35a, 35b so as to make the deformation of the yoke 35 easier for it to be removed from the bearing 17 by an operator.

Moreover, referring again to FIG. 5, the yoke 35 may have on its external wall at least one clipping tongue 43 in order to interact with a matching clipping notch 45a, 45b provided in the bearing 17, so as to form an additional immobilization means by clipping the yoke 35 in the retention position.

In this example, the yoke 35 has two tongues 43 on one and the same lateral branch 35b, a first tongue 43 on the top of the branch and a second tongue 43 on the bottom of the branch.

In the open position (FIG. 7), the tongues 43 engage respectively first matching notches 45a so that the yoke 35 is held in this open position to allow the support shaft 15 to be installed in the yoke 35.

Then, when the yoke 35 is rotated to the retention position, the tongues 43 engage respectively second matching notches 45b (FIG. 6b) so as to prevent any inadvertent rotation of the yoke 35 in order to return to the open position. The support shaft 15 can therefore not be withdrawn from the bearing 17 while the yoke 35 is in this retention position.

Thus, when the antitheft device 1 is not yet installed on the steering column, the two half-collars 9a, 9b cannot be separated without first removing the yoke 35 forced into the bearing 17 or retained by an additional means, for example a hooking or clipping means.

Thus, the assembly of the housing 3 and of the clamping collar 9 of the antitheft device 1 takes place as follows.

All of the components of the housing 3 are assembled and inserted into the housing 3. The first half-collar 9a is attached to the housing 3. The yoke and the support shaft 15 supported by the first end 11 of the second half-collar 9b are inserted into the bearing 17 associated with the first half-collar 9a according to the first or the second embodiment described above, and the yoke 35 is placed in the retention position in order to keep the support shaft 15 in place in the bearing 17.

The antitheft device 1 thus assembled by hand can be manipulated and transported without risk of the half-collars 9a, 9b inadvertently separating, in order to be installed on the steering column.

Moreover, when the antitheft device 1 is installed on the steering column, the second end 13 of the second half-collar 9b is attached to the first half-collar 9a using a clamping means, for example a screw interacting with tapped holes 47 respectively provided in the first half-collar 9a and the second half-collar 9b.

In this case, the force applied to the second half-collar 9b ensures that the support shaft 15 is retained in the bearing 17. Thus, when the antitheft device 1 is installed on the steering column, the two half-collars 9a, 9b cannot be separated without first removing the clamping means.

Thus the installation of the antitheft device 1 on the steering column takes place as follows. The first half-collar 9a is placed around the steering column, the second half-collar 9b pivots so that its second end 13 is placed facing the first half-collar 9a and the latter is attached by clamping to the first half-collar 9a.

The bearing 17 withstands the forces generated by the clamping of the two half-collars 9a, 9b so that the support shaft 15 is held in the bearing 17 when the antitheft device 1 is installed on the steering column.

It can therefore be understood that such an antitheft device provides a sturdy connection between the two half-collars 9a, 9b in order to withstand the force generated by the clamping on the steering column and in order to withstand break-in attempts while preventing the two half-collars 9a, 9b from separating before installation on the steering column.

Advantageously, such an antitheft device for a steering column allows a manual installation of the antitheft device on the steering column that is simple and not very costly, while preventing the two clamping half-collars from separating before installation on the steering column.

The invention claimed is:

1. An antitheft device for a steering column of a motor vehicle, comprising:
 a housing comprising a movable bolt arranged to prevent the steering column from rotating, and a lock for controlling the movement of said bolt;
 a clamping collar configured to be mounted on the steering column and having a first half-collar secured to the housing, and a second half-collar of which:
  a first end is mounted articulated relative to the first half-collar along a pivoting axis substantially parallel to an axis of the steering column, and
  a second end is configured to be attached to the first half-collar upon installation on the steering column, using a clamping means,
 wherein:
  the second half-collar supports, at a first end, a pivoting support shaft, said support shaft being formed in a single piece with the second half-collar,
  the first half-collar comprises a bearing associated with said support shaft, an opening for access to said bearing; and
 a means for retaining said support shaft in said first half-collar facing said bearing to prevent an inadvertent separation of said half-collars before installation on the steering column, wherein the retention means is positioned to at least partially close off the opening for access to said bearing and keep said support shaft in said first half-collar facing said bearing, so that the two half-collars are provisionally secured before being tightly installed around the steering column.

2. The antitheft device as claimed in claim 1, wherein the retention means comprises a substantially U-shaped retention yoke for receiving said support shaft.

3. The antitheft device as claimed in claim 2, wherein the retention means is mounted to be able to move in translation in said bearing in order to reach said retention position.

4. A method for installing a retention yoke in the antitheft device as claimed in claim 3, the method comprising:
 installing said support shaft in the retention yoke; and installing an assembly formed by the retention yoke and said support shaft in said first half-collar.

5. The antitheft device as claimed in claim 2, wherein the retention means is mounted so as to be able to rotate in said bearing to reach said retention position.

6. The antitheft device as claimed in claim 5, further comprising a means for immobilizing the retention means in the retention position.

7. The antitheft device as claimed in claim 6, wherein the housing comprises an immobilization means configured to rest against said retention means.

8. The antitheft device as claimed in claim 6, wherein the retention yoke has a substantially hook-shaped portion configured to interact with a counter-hook provided on a component of the housing.

9. The antitheft device as claimed in claim 6, wherein the retention yoke has, on an outer wall, at least one clipping tongue for interacting with at least one complementary clipping notch provided in the first half-collar.

10. The antitheft device as claimed in claim 5, wherein the retention means is held in the retention position by a forced installation of the retention means onto said bearing.

11. A method for installing a retention yoke in the antitheft device as claimed in claim 5, the method comprising:

installing the retention yoke in said first half-collar along a first insertion axis that is substantially parallel to said pivoting axis, in an open position in which an internal space of said yoke delimited by the two lateral branches opens onto the opening of said first half-collar so that the openings of said first half-collar and of said yoke coincide, installing said support shaft in said yoke along a second insertion axis that is substantially perpendicular to the first insertion axis, and rotating an assembly formed by said yoke and said support shaft on said pivoting axis until one of the two lateral branches of said yoke at least partially closes the opening of said first half-collar.

12. The antitheft device as claimed in claim 2, wherein the retention yoke has a lateral branch which at least partially closes off the opening for access to said bearing.

13. The antitheft device as claimed in claim 1, the first half-collar comprises an insertion guide for inserting said support shaft into said bearing.

14. The antitheft device as claimed in claim 1, wherein the retention means is made of plastic or metal.

* * * * *